Patented Aug. 9, 1949

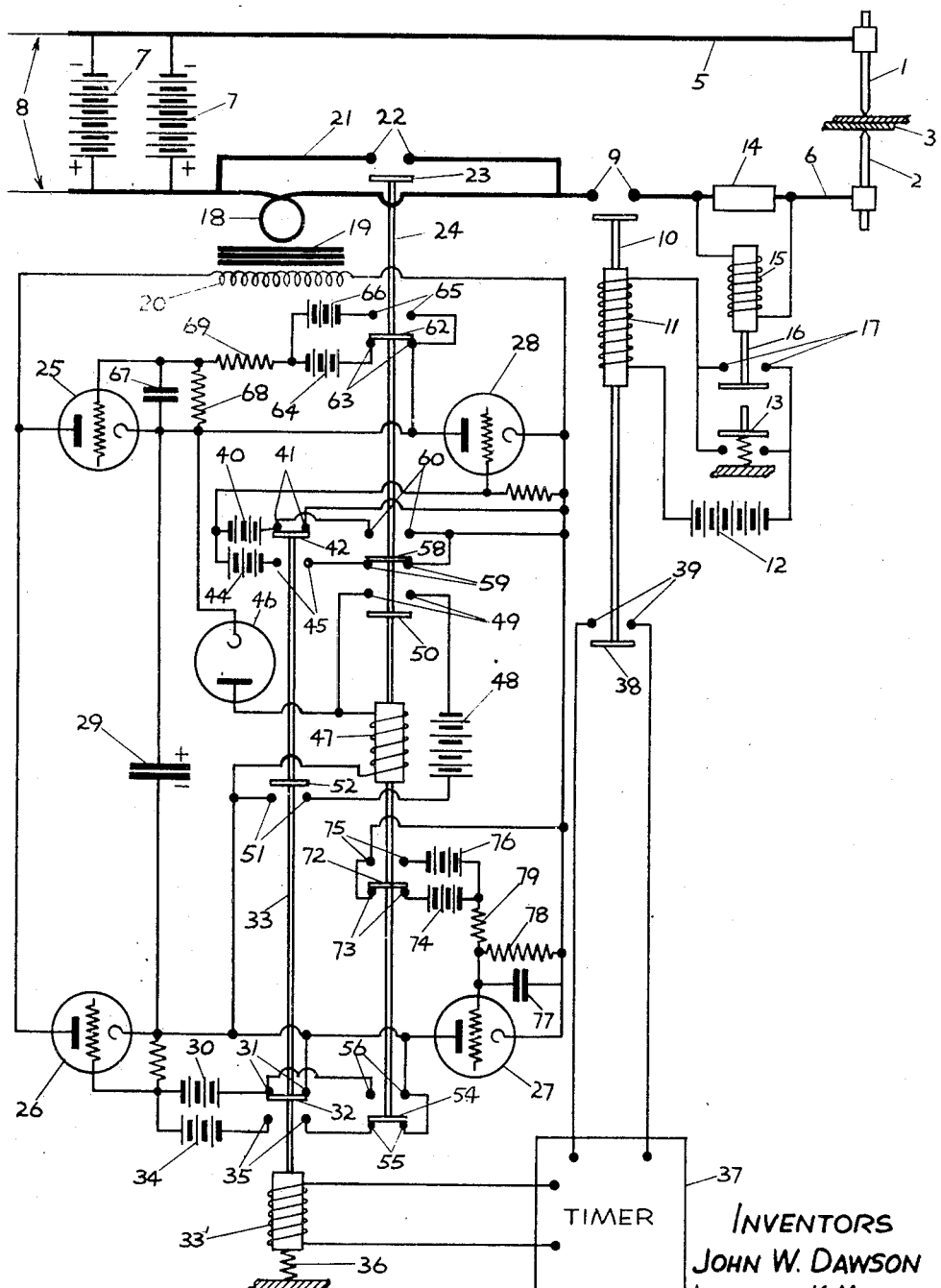

2,478,527

UNITED STATES PATENT OFFICE 2,478,527

ELECTRICAL SYSTEM

John W. Dawson, West Newton, and Laurence K. Marshall, Cambridge, Mass., assignors to Raytheon Manufacturing Company, Newton, Mass., a corporation of Delaware Application January 7, 1946, Serial No. 639,684

23 Claims. (Cl. 171—97)

This invention relates to electrical systems and more particularly to resistance welding systems of the type in which the welding energy is derived from a source of continuous direct current such as that delivered from one or more storage batteries.

In resistance welding systems it has heretofore been the practice to draw the required welding energy intermittently from a power supply line. This requires that energy be drawn from the line in intermittent power peaks, and although the energy drawn from the supply line is at a relatively low rate over any period of time the intermittent peak demand becomes a source of disturbance to all other electric equipment supplied from the same line. To avoid the heavy peak loads imposed by conventional equipment it has been proposed to derive the welding energy from storage batteries. The storage batteries may be continuously charged from a supply line, and since the power is supplied continuously at a relatively low rate the heavy peak demands of conventional equipment are avoided. However, such storage battery welding systems require that a very high direct current be controlled by a switch which must be open while very high currents are passing therethrough. This necessitates the use of massive heavy duty switches capable of rapidly interrupting currents of 20,000 to 50,000 amperes. Such switches are of special construction usually being water cooled and capable of gradually reducing the current flow prior to the actual opening of the switch in order to avoid heavy arcing at the break.

It is among the objects of the present invention to provide a welding system of the type described in which the storage batteries may be disconnected from the welding electrodes without the necessity of opening a circuit through which high currents are flowing. To this end it is a feature of the present invention to utilize a portion of the energy from the system to set up a blocking force momentarily opposing the flow of current through the system, and to provide means whereby the connections between the storage batteries and welding electrodes may be opened at an instant during which little or no current is flowing through the line.

In certain electrical systems, it is desirable to momentarily increase the energy supplied to load at the initiation of the current supply. For example in welding systems of the storage battery type it is desirable to increase the energy supplied to the welding load at the initiation of the welding impulse to a value substantially above that supplied by the direct current source alone. This increased energy aids in breaking up and expelling from the weld zone any film or oxide layer between the surfaces of the work pieces. After such initial increase the energy required for the fusion of the work pieces may be derived from the direct current source alone.

It is among the objects of the present invention to provide for such an increase in the energy supplied to the load at the beginning of the current impulse. To this end the invention contemplates a construction in which energy, diverted from the system for the purpose of setting up a blocking force at the desired termination of the welding impulse, is trapped and utilized to increase the energy supplied to the load at the initiation of the next succeeding welding impulse.

The present invention will be applicable to the control of high currents in various electrical systems and the application of the present invention to such systems will be apparent to those skilled in the art from the following description of its application in a welding system.

Other objects and features of the invention will be apparent to those skilled in the art from a consideration of the following detailed description taken in conjunction with the accompanying drawing which illustrates diagrammatically the application of the invention to a welding system of the storage battery type.

Referring to the drawing, reference numerals 1 and 2 indicate a pair of welding electrodes one or both of which are movable into engagement with the work 3. Supply lines 5 and 6 which are adapted to carry very high currents connect the welding electrodes to a plurality of storage batteries 7 which may be arranged in any desired grouping to supply the required current flow at the voltage necessary to supply the welding energy, the amount of which will, of course, vary depending upon the nature of the work 3. The batteries 7 are adapted to be charged from a relatively low power supply line 8 which may be connected to any commercial line through a rectifying system not shown. The batteries 7 are adapted to be intermittently connected to the welding electrodes through a suitable switch, which, in this instance, comprises a pair of normally open contacts 9 which may be closed by a relay 10. The relay 10 is provided with a solenoid 11 which is energized by current from a battery 12 upon the closure of a push button 13. It will be understood that the push button 13 is to be actuated after the closure of the welding electrodes 1 and 2 upon the work 3 and that it may be actuated by the operator upon such closure or it may be actuated automatically in response to such closure of the welding electrodes. Upon the closure of the push button switch 13 current flows through the lines 5 and 6, and a portion of this current taken across a shunt 14 is utilized to energize the solenoid 15 of a holding relay 16 which is adapted to close a pair of contacts 17 which maintains a closed circuit for the solenoid 11 through the battery 12 after the push button 13 has been released as long as sufficient current flows through the shunt 14.

In order to provide a means for momentarily discontinuing or at least greatly reducing the flow of current through the welding electrodes so that the contacts 9 may be opened at an instant when there is little or no flow of current through the electrodes 1 and 2, a means is provided for coupling a reactance into the supply lines 5 and 6. In this instance the coupling means comprises a loop 18, in one of the heavy duty lines, in this instance 6, which loop functions as the primary winding of a transformer 19 having a secondary winding 20. In order to provide a by-pass circuit to cut the primary loop 18 into or out of the path of current flow from the batteries 7 to the welding electrodes, a shunt circuit 21 having a pair of normally open contacts 22 adapted to be closed by the armature 23 of a relay 24 is provided across the loop 18. The relay 24 is adapted to be energized to control the opening and closing of the contacts 22, in a manner which will now be made apparent.

A pair of grid-controlled arc tubes 25 and 26 have their anodes jointly connected to the left-hand side of the secondary winding 20, the cathode of the tube 26 is connected to the anode of a similar grid-controlled arc tube 27, and the cathode of the tube 25 is connected to the anode of a fourth grid-controlled vacuum tube 28.

The cathodes of the tubes 27 and 28 are jointly connected to the right-hand side of the secondary winding 20. An energy storage device, in this instance a condenser 29, is connected across the cathodes of the tubes 25 and 26. The grid of the tube 26 is normally driven negative by a battery 30, the negative terminal of which is directly connected to the cathode through the contacts 31 which are normally closed by the armature 32 of a relay 33. The term "normally" as herein used with respect to any relay or the contacts controlled thereby refers to the condition existing when the relay is unenergized. In this instance the relay 33 is normally biased upwardly by a spring 36 and is energized by a coil 33' acting in opposition to this spring.

In order to drive the grid of the tube 26 positive a battery 34 is provided having its positive terminal connected directly to said grid and its negative terminal adapted to be connected to the cathode of said tube upon the closure of a pair of contacts 35 by the armature 32 upon the energization of the relay 33. The closure of contacts 35 connects the negative terminal of the battery 34 to the cathode of the tube 26 through a normally closed circuit which may, however, be opened upon the energization of relay 24 in a manner which will hereafter be fully described.

In order to actuate the relay 33, and thus effect the closure of the contacts 35, the solenoid 33' is energized from a timer 37. The operation of the timer 37 is adapted to be initiated upon the closure of the contacts 9 by means of an armature 38 on the relay 10, which armature is adapted to close the normally open contacts 39 of a timer circuit which thereupon initiates the supply of current to the solenoid 33' and continues this supply of current for a predetermined period thereafter.

The control grid of the tube 28 is normally driven negative from a battery 40, the negative terminal of which is connected directly to the grid and the positive terminal of which is normally connected to the cathode of the tube 28 through a pair of contacts 41 which are normally closed by an armature 42 of the relay 33. Upon the energization of the relay 33, the negative bias to the grid of the tube 28 is disconnected and the grid is driven positive by a battery 44, the positive terminal of which is connected directly to the grid and the negative terminal of which is connected to the cathode of the tube 28 through a pair of contacts 45. The contacts 45 are normally open but are closed by armature 42 upon the energization of the relay 33. When the contacts 45 are closed by the armature 42 the negative terminal of the battery 44 will be connected to the cathode of the tube 28 through a circuit which may be opened upon the energization of the relay 24 in a manner which will be hereinafter more fully described.

At the time when the grid of tube 28 is driven positive the condenser 29 will be charged in the polarity indicated as a result of prior operation.

In the operation of the system, so far described, when the current flow through the welding system is initiated by the energization of the solenoid 11 of the relay 10, the grids of the tubes 26 and 28, which are normally negative, will be driven positive and the condenser 29 will thus be connected across the primary winding 20 of the transformer 19 in such a direction that the discharge thereof will be from right to left through the secondary winding and will tend to boost the flow of current from left to right through the primary loop 18. Upon the discharge of the condenser 29, current will continue to flow through the secondary winding 20 and the tubes 26 and 28 in a direction tending to charge the condenser 29 in an inverse direction. The charging of the condenser 29 in an inverse direction is prevented by a shunt tube 46, across the condenser 29, with its anode connected to the normally negative side thereof and its cathode to the normally positive side thereof. Accordingly upon the appearance of an inverse potential on the condenser 29 the tube 46 becomes conductive to provide a shunt circuit across the condenser. The energy flowing through this shunt circuit is utilized to energize the solenoid 47 of the relay 24 and this closes the contacts 22 of by-pass circuit 21 permitting the current flowing to the welding electrodes to by-pass the primary loop 18. Upon the closure of the shunt circuit 21 no further current is induced in the secondary winding 20 and accordingly the current through the shunt tube 46 and the solenoid 47 decays. However, a holding current is supplied to the solenoid 47 from a battery 48 through a pair of contacts 49 which are closed by an armature 50 on the relay 24. The circuit from the battery 48 through the solenoid 47 may also be interrupted by the opening of a pair of contacts 51 adapted to be closed by armature 52 on the relay 33. The relay 33 having been initially energized upon the closure of the contacts 9 the contacts 51 will thus be closed to complete the circuit of the battery 48 to the solenoid 47 at the time of the energization of this solenoid by the flow of energy through the shunt tube 46.

The energization of the relay 24 also terminates the supply of positive potential to the grids of the tubes 26 and 28 and applies a negative potential to these grids in the following manner. An armature 54 on the relay 24 normally closes a pair of contacts 55 completing the circuit of the battery 34 through the contacts 35 when the relay 33 is energized. Now upon the energization of the relay 24 this circuit of the battery 34 is broken and a circuit through the contacts 56 is closed by the armature 54 to again complete a cathode-grid circuit for the tube 26 through the battery 30 in a direction to apply a negative potential to the grid even though the circuit through the contacts 31 is now open due to the energization of relay 33. Likewise, an armature 58 which normally closes a pair of contacts 59 to complete a circuit through the contacts 45, connecting the positive terminal of the battery 44 to the grid of the tube 28 and the negative terminal thereof to the cathode of said tube, is now opened disconnecting the supply of positive bias to the grid of said tube and a pair of contacts 60 are closed by the armature 58 completing a circuit for applying negative potential from the battery 40 to the grid of the tube 28 even though the contacts 41 are now open.

Thus, upon the energization of the relay 24, a negative bias is applied to the grids of the tubes 26 and 28. The armature 23 remains upon the contacts 22 due to the holding current supplied by the battery 48 to the solenoid 47 of the relay 24. The energy through the main welding circuit will continue to flow through the by-pass circuit 21 as long as the relay 24 remains energized.

The grids of the tubes 25 and 27 are normally driven negative in the following manner: A battery 64 has its negative terminal connected to the grid of the tube 25 and its positive terminal connected to the cathode of said tube through a pair of contacts 63 which are normally closed by an armature 62 on the relay 24. Upon the energization of the relay 24 the contacts 63 are opened and a pair of contacts 65 are closed by the armature 62 to complete a circuit connecting the positive terminal of a battery 66 to the grid of the tube 25 and the negative terminal of this battery to the cathode of said tube. During the period when the negative potential is applied to the grid of the tube 25 from the battery 64, a condenser 67, across the cathode grid circuit of the tube 25 and therefore in parallel with the grid resistor 68, is charged through the resistor 69 in such a direction that its upper end becomes negative and its lower end becomes positive thus maintaining a negative bias upon the grid for a short time after the opening of the contacts 63 and the closure of the contacts 65. Upon the closure of the contacts 65 the potential applied to the condenser 67 is reversed, the side thereof connected to the grid becoming positive and the side connected to the cathode becoming negative. Thus sometime after the closure of the by-pass circuit 21 the grid of the tube 25 is driven positive. However, since at this time no current is induced in the secondary winding 20 of transformer 19, no potential is applied across this tube and accordingly there is no conduction therethrough. The tube 27 is likewise normally supplied with a negative bias through the contacts 73 which are normally closed by an armature 72 on the relay 24 to connect the positive terminal of a battery 74 to the cathode of said tube and the negative terminal to the grid thereof. Upon the energization of the relay 24 the contacts 73 are opened and a pair of contacts 75 are closed by the armature 72 connecting the negative terminal of a battery 76 to the cathode of the tube 27 and the positive terminal of said battery to the grid of said tube. A condenser 77, connected across the cathode grid circuit of the tube 27 and therefore in parallel with the grid resistor 78, is charged by the batteries 74 and 76 through a resistor 79 and thus like the condenser 67 of the tube 25 condenser 77 will receive a charge in such a polarity that the side thereof connected to the grid of the tube 27 will be positive and the side thereof connected to the cathode will be negative a short time after the closure of the contacts 75 by the armature 72. However, since no potential is applied across the anode-cathode circuit of the tube 27 at the time of the closure of the contacts 75, there will be no conduction through this tube. As long as the shunt circuit 21 is closed there will be no substantial energization of the secondary winding 20 of the transformer 19. This winding will, in effect, be cut out of the circuit for a time during which the main welding energy is supplied to the work 3. At the end of a predetermined time after the closure of the contacts 9 the timer 37 discontinues the supply of energizing current to the solenoid 33' of the relay 33. Accordingly, relay 33 is actuated upwardly by the spring 36 breaking the energizing circuit of the solenoid 47 through the contacts 51 and thus permitting the relay 24 to drop to its normal position, that is, the position in which the contacts 22 are open. The relays 24 and 33 being in their normal position, that is, the position shown, the grids of the tubes 25, 26, 27, and 28 are connected respectively to batteries 64, 30, 74, and 40 to apply negative potential thereto. However, the grids of tubes 25 and 27 continue to be driven positive due to the direction of the charge on the condensers 67 and 77 for a short time until this charge can be reversed by batteries 64 and 74. The main welding current through the line 6 having been diverted from the by-pass line 21 through the primary loop 18, due to the opening of the shunt circuit 21, a current is induced in the secondary winding 27 in such a direction that its left-hand end is positive. Accordingly since the tubes 25 and 27 are driven positive by the charges on condensers 67 and 77, respectively, tubes 25 and 27 fire and the condenser 29 is connected across the secondary winding 20 through the tubes 25 and 27 in such a direction that the condenser 29 tends to become charged in the polarity indicated.

At the instant when the contacts 22 of the shunt circuit 21 are opened, the reactance introduced into the supply lines 5 and 6 by the transformer 19 is low, since at this instant the circuit of the secondary winding 20 of said transformer is closed through the condenser 29. Momentarily energy flowing through the line 6 is diverted, in part, to the condenser 29 until the charge on this condenser is built up to a value at which it tends to fully oppose the energy applied thereto from the transformer 19. When the condenser 29 becomes fully charged, the reactance introduced into the supply line by the transformer 19 rises to its maximum value. Accordingly the energy through the line 6 falls momentarily to substantially zero. The potential drop across the shunt 14 fails and accordingly there is no current through the energizing coil 15 of the holding relay 16. The energization circuit for the coil 11 of the relay 10 is thus broken and the main welding line is opened at the contacts 9.

At the time when the contacts 9 are opened the energization current to the relays 10, 24, and 33 has been discontinued so that these are in their normal or deenergized condition. The bias on the grids of each of the tubes 25, 26, 27 and 28 is such as to prevent conduction in these tubes, and a charge has been trapped on the condenser 29 in the same direction as the initial charge thereon. The system has thus returned to its initial or normal state and is in a condition to produce another weld so that the time intervening between welds need be only that required to open the welding electrodes and close them at the point desired for the next succeeding weld, which may then be effected by closure of the switch 13.

The invention provides a means for controlling heavy direct currents, without the necessity of opening the circuit through which such currents must flow at a time when the current therethrough is high. Arcing does not occur upon the opening of either the contacts 9 or 22, for the current through the contacts 9 is negligible at the time of the opening thereof, and the current through the contacts 22 has a path of low impedance around these contacts at the instant when these contacts are opened. Thus, heavy duty switches are not required at any point in the system.

While there has been herein described a preferred embodiment of the invention, other embodiments within the scope of the appended claims will be obvious to those skilled in the art from a consideration of the form shown and the teachings hereof.

What is claimed is:

1. An electrical system comprising a source of direct current, a load, a supply line connecting said load to said source, a switch in said line, means for actuating said switch to supply energy to said load, means for introducing a voltage into said line for reducing the current in said line, and means responsive to said reduction of the current to a low value for opening said switch.

2. An electrical system comprising a source of direct current, a load, a supply line connecting said load to said source, a switch in said line, means for actuating said switch to supply energy to said load, means for introducing a voltage into said line, which voltage is adapted to increase from a low value at the instant of introduction to a value sufficient to reduce said current to substantially zero, and means responsive to said reduction of said current to substantially zero for opening said line at a time when said reactance is high.

3. An electrical system comprising a source of direct current, a load, a supply line connecting said load to said source, an energy storage device, and means responsive to the initiation of the flow of current from said source to said load for discharging said energy storage device into said line to momentarily boost the energy supplied to said load.

4. An electrical system comprising a source of direct current, a load, a supply line connecting said load to said source, a storage condenser, and means responsive to the initiation of the flow of current from said source to said load for discharging said storage condenser into said line to momentarily boost the energy supplied to said load.

5. An electrical system comprising a source of direct current, a load, a supply line connecting said load to said source, an energy storage device, means effective upon the initiation of the flow of current from said source to said load for discharging said energy storage device into said line to momentarily boost the energy supplied to said load, and means effective after a predetermined time delay from the initiation of the flow of current through said line for diverting energy from said source to said energy storage device and reducing the current through said line to substantially zero.

6. An electrical system comprising a source of direct current, a load, a supply line connecting said load to said source, a storage condenser, means effective upon the initiation of the flow of current from said source to said load for discharging said storage condenser into said line to momentarily boost the energy supplied to said load, and means effective subsequent to the discharge of said condenser for diverting energy from said source to recharge said condenser in the original polarity and thereby momentarily reduce the current through said line to substantially zero.

7. An electrical system comprising a source of direct current, a load, a supply line connecting said load to said source, a switch in said line, means for actuating said switch to supply energy to said load, a circuit coupled to said line adapted to introduce a reactance into said line, means connected across said coupling between said line and said circuit providing a shunt path around said coupling, means for opening said shunt path at a time when the reactance introduced by said circuit is low, and means for opening said line at a time when the reactance introduced by said circuit is high.

8. An electrical system comprising a source of direct current, a load, a supply line connecting said load to said source, a switch in said line, means for actuating said switch to supply energy to said load, a circuit including a condenser coupled to said line adapted to introduce a reactance into said line, the value of which reactance varies with the charge on said condenser, means connected across said coupling between said line and said circuit providing a shunt path around said coupling, means for opening said shunt path at a time when the reactance introduced by said circuit is low, and means for opening said line at a time when the reactance introduced by said circuit is high.

9. An electrical system comprising a source of direct current, a load, a supply line connecting said load to said source, a switch in said line, means for actuating said switch to supply energy to said load, a circuit including a condenser coupled to said line adapted to introduce a reactance into said line, the value of which reactance varies with the charge on said condenser, means connected across said coupling between said line and said circuit providing a shunt path around said coupling, means for opening said shunt path to charge said condenser through said coupling, and means for opening said line at a time when the reactance introduced by the charging of said condenser is high.

10. An electrical system comprising a source of direct current, a load, circuit means for connecting said load to said source, a switch in said circuit means, means for actuating said switch to supply energy to said load, an energy storage device, coupling means connecting said energy storage device to said circuit means, a shunt circuit by-passing said coupling means, means effective after a predetermined time delay from the closure of said switch for opening said shunt circuit and supplying energy to said storage device until the stored energy substantially opposes the flow of energy through said circuit means, and means responsive to the drop in current through said circuit means for opening said switch.

11. An electrical system comprising a source of direct current, a load, circuit means for connecting said load to said source, a switch in said circuit means, means for actuating said switch to supply energy to said load, an energy storage device, coupling means connecting said energy storage means to said circuit means, a shunt circuit by-passing said coupling means, means effective after a predetermined time delay from the closure of said switch for opening said shunt circuit and supplying energy to said storage device until the stored energy substantially opposes the flow of energy through said circuit means, means responsive to the drop in current through said circuit means for opening said switch, and means effective after a predetermined time delay from the opening of said shunt circuit for trapping the energy supplied to said storage device.

12. An electrical system comprising a source of direct current, a load, circuit means for connecting said load to said source, a switch in said circuit means, means for actuating said switch to supply energy to said load, a storage condenser, coupling means connecting said condenser to said circuit means, a shunt circuit by-passing said coupling means, means effective after a predetermined time delay from the closure of said switch for opening said shunt circuit and charging said storage condenser until the stored energy substantially opposed the flow of energy through said circuit means, and means responsive to the drop in current through said circuit means for opening said switch.

13. An electrical system comprising a source of direct current, a load, circuit means for connecting said load to said source, a switch in said circuit means, means for actuating said switch to supply energy to said load, a storage condenser, coupling means connecting said storage condenser to said circuit means, a shunt circuit by-passing said coupling means, means effective after a predetermined time delay from the closure of said switch for opening said shunt circuit and charging said storage condenser until the stored energy substantially opposes the flow of energy through said circuit means, means responsive to the drop in current through said circuit means for opening said switch, and means effective after a predetermined time delay from the opening of said shunt circuit for trapping the charge on said condenser.

14. An electrical system comprising a source of direct current, a load, circuit means for connecting said load to said source, a switch in said circuit means, means for actuating said switch to supply energy to said load, a storage condenser, coupling means connecting said storage condenser to said circuit means, a shunt circuit by-passing said coupling means, means effective after a predetermined time delay from the closure of said switch for opening said shunt circuit and charging said storage condenser through said coupling means until the stored energy substantially opposes the flow of energy through said circuit means, and means responsive to the drop in current through said circuit means for opening said switch.

15. An electrical system comprising a source of direct current, a load, circuit means for connecting said load to said source, a switch in said circuit means, means for actuating said switch to supply energy to said load, an energy storage device, coupling means connecting said energy storage means to said circuit means, a shunt circuit by-passing said coupling means, means effective upon the closure of said switch for discharging energy from said storage device into said circuit means through said coupling means in a direction to augment the energy supplied to said load, means responsive to the termination of discharge of said energy storage device for closing said shunt circuit, means effective after a predetermined time delay from the closure of said switch for opening said shunt circuit and supplying energy to said storage device until the stored energy substantially opposes the flow of energy through said circuit means, and means responsive to the drop in current through said circuit means for opening said switch.

16. An electrical system comprising a source of direct current, a load, circuit means for connecting said load to said source, a switch in said circuit means, means for actuating said switch to supply energy to said load, a storage condenser, coupling means connecting said storage condenser to said circuit means, a shunt circuit by-passing said coupling means, means effective upon the closure of said switch for discharging energy from said storage condenser into said circuit means through said coupling means in a direction to augment the energy supplied to said load, means responsive to the termination of discharge of said energy storage condenser for closing said shunt circuit, means effective after a predetermined time delay from the closure of said switch for opening said shunt circuit and supplying energy to said storage condenser until the stored energy substantially opposes the flow of energy through said circuit means, and means responsive to the drop in current through said circuit means for opening said switch.

17. An electrical system comprising a source of direct current, a load, circuit means for connecting said load to said source, a switch in said circuit means, means for actuating said switch to supply energy to said load, a transformer having its primary winding connected in series with said load and said switch, a shunt circuit by-passing said primary winding, an energy storage device connected across the terminals of the secondary winding of said transformer, means effective upon the closure of said switch for discharging energy from said storage device into said transformer in a direction to augment the energy supplied to said load, means responsive to the discharge of said energy storage device for closing said shunt circuit, means effective after a predetermined time delay from the closure of said switch for opening said shunt circuit and supplying energy to said storage device until the stored energy substantially opposes the flow of energy through said circuit means, and means responsive to the drop in current through said circuit means for opening said switch.

18. An electrical system comprising a source of direct current, a load, circuit means for connecting said load to said source, a switch in said circuit means, means for actuating said switch to supply energy to said load, a transformer having its primary winding connected in series with said load and said switch, a shunt circuit by-passing said primary winding, an energy storage device, means effective on the closure of said switch for connecting said energy storage device across the terminals of the secondary winding of said transformer to discharge energy from said storage device into said transformer in a direction to augment the energy supplied to said load, means responsive to the termination of the discharge of said energy storage device for closing said shunt circuit, means effective after a predetermined time delay from the closure of said switch for opening said shunt circuit and supplying energy to said storage device until the stored energy substantially opposes the flow of energy through said circuit means, and means responsive to the drop in current through said circuit means for opening said switch.

19. An electrical system comprising a source of direct current, a load, circuit means for connecting said load to said source, a switch in said circuit means, means for actuating said switch to supply energy to said load, a transformer having its primary winding connected in series with said load and said switch, a shunt circuit by-passing said primary winding, an energy storage device connected across the terminals of the secondary winding of said transformer, means effective upon the closure of said switch for discharging energy from said storage device into said transformer in a direction to augment the energy supplied to said load, means responsive to the discharge of said energy storage device for closing said shunt circuit, means effective after a predetermined time delay from the closure of said switch for opening said shunt circuit and supplying energy to said storage device until the stored energy substantially opposes the flow of energy through said circuit means, means responsive to the drop in current through said circuit means for opening said switch, and means effective after a predetermined time delay from the opening of said shunt circuit for disconnecting said energy storage device from said secondary winding of said transformer.

20. An electrical system comprising a source of direct current, a load, circuit means for connecting said load to said source, a switch in said circuit means, means for actuating said switch to supply energy to said load, a transformer having its primary winding connected in series with said load and said switch, a shunt circuit by-passing said primary winding, a storage condenser connected across the terminals of the secondary winding of said transformer, means effective upon the closure of said switch for discharging energy from said storage condenser into said transformer in a direction to augment the energy supplied to said load, means responsive to the discharge of said storage condenser for closing said shunt circuit, means effective after a predetermined time delay from the closure of said switch for opening said shunt circuit and supplying energy to said storage condenser until the stored energy substantially opposes the flow of energy through said circuit means, and means responsive to the drop in current through said circuit means for opening said switch.

21. An electrical system comprising a source of direct current, a load, circuit means for connecting said load to said source, a switch in said circuit means, means for actuating said switch to supply energy to said load, a transformer having its primary winding connected in series with said load and said switch, a shunt circuit by-passing said primary winding, a storage condenser connected across the terminals of the secondary winding of said transformer, means effective upon the closure of said switch for discharging energy from said storage condenser into said transformer in a direction to augment the energy supplied to said load, means responsive to the discharge of said storage condenser for closing said shunt circuit, means effective after a predetermined time delay from the closure of said switch for opening said shunt circuit and supplying energy to said storage condenser from said transformer until the stored energy substantially opposes the flow of energy through said circuit means, and means responsive to the drop in current through said circuit means for opening said switch.

22. An electrical system comprisng a source of direct current, a load, circuit means for connecting said load to said source, a switch in said circuit means, means for actuating said switch to supply energy to said load, a transformer having its primary winding connected in series with said load and said switch, a shunt circuit by-passing said primary winding, a storage condenser connected across the terminals of the secondary winding of said transformer, means effective upon the closure of said switch for discharging energy from said storage condenser into said transformer in a direction to augment the energy supplied to said load, means responsive to the discharge of said storage condenser for closing said shunt circuit, means effective after a predetermined time delay from the closure of said switch for opening said shunt circuit and supplying energy to said storage condenser until the stored energy substantially opposes the flow of energy through said circuit means, means responsive to the drop in current through said circuit means for opening said switch, and means effective after a predetermined time delay from the opening of said shunt circuit for disconnecting said condenser from said secondary winding of said transformer.

23. An electrical system comprising a source of direct current, a load, a supply line connecting said load to said source, a switch in said line, means for actuating said switch to supply energy to said load, commutating means for introducing a voltage into said line, which voltage is adapted to increase from a low value at the instant of introduction to a value sufficient to reduce said current to substantially zero, and means responsive to said reduction of said current to substantially zero for opening said line at a time when said reactance is high, said commutating means comprising a transformer having a relatively low number of primary turns connected in series in said line, and a relatively higher number of turns connected across a storage condenser.

JOHN W. DAWSON.
LAURENCE K. MARSHALL.

REFERENCES CITED

The following references are of record in the file of this patent:

UNITED STATES PATENTS

| Number | Name | Date |
| --- | --- | --- |
| 644,051 | Berg | Feb. 27, 1900 |
| 2,228,070 | Bellaschi | Jan. 7, 1941 |
| 2,302,119 | Hagedorn | Nov. 17, 1942 |
| 2,319,215 | Dawson | May 18, 1943 |